H. P. HANSON.
CATTLE STANCHION.
APPLICATION FILED JAN. 7, 1919.
1,360,940.
Patented Nov. 30, 1920.
2 SHEETS—SHEET 2.
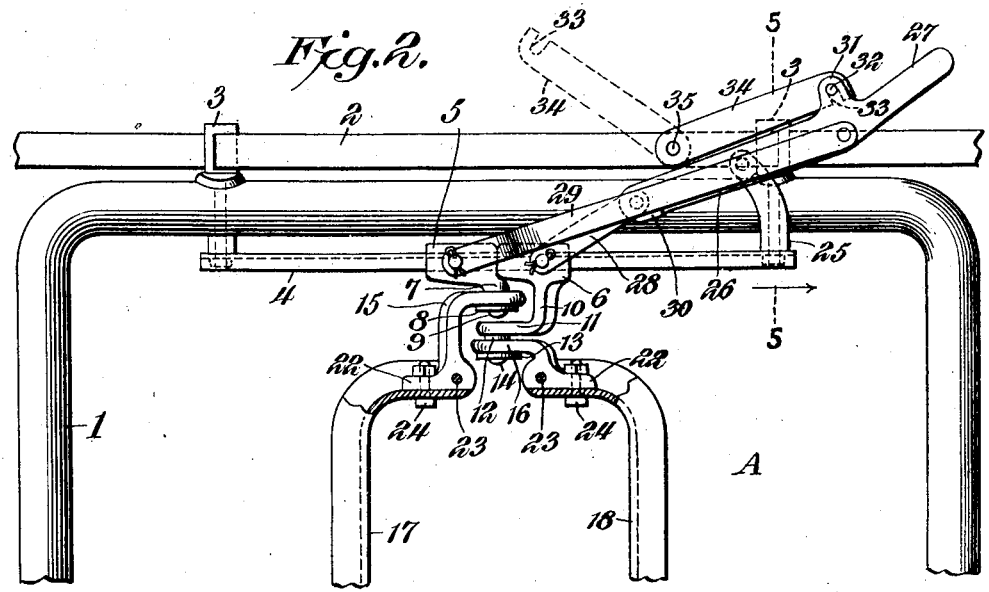
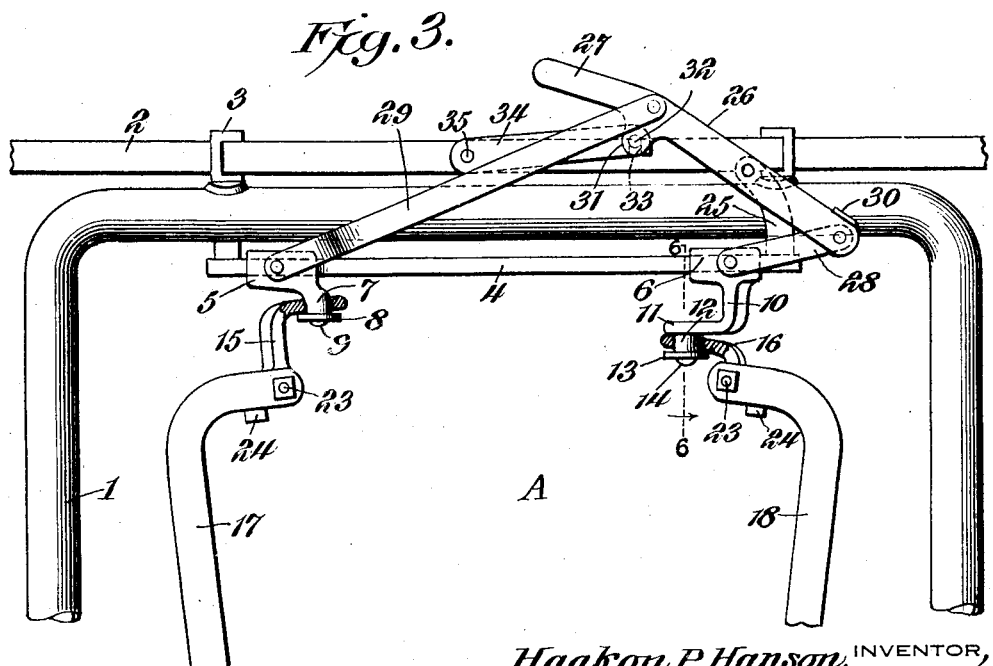
WITNESSES
Howard D. Orr.
F. T. Chapman.
Haakon P. Hanson, INVENTOR,
BY C. G. Giggers
ATTORNEY

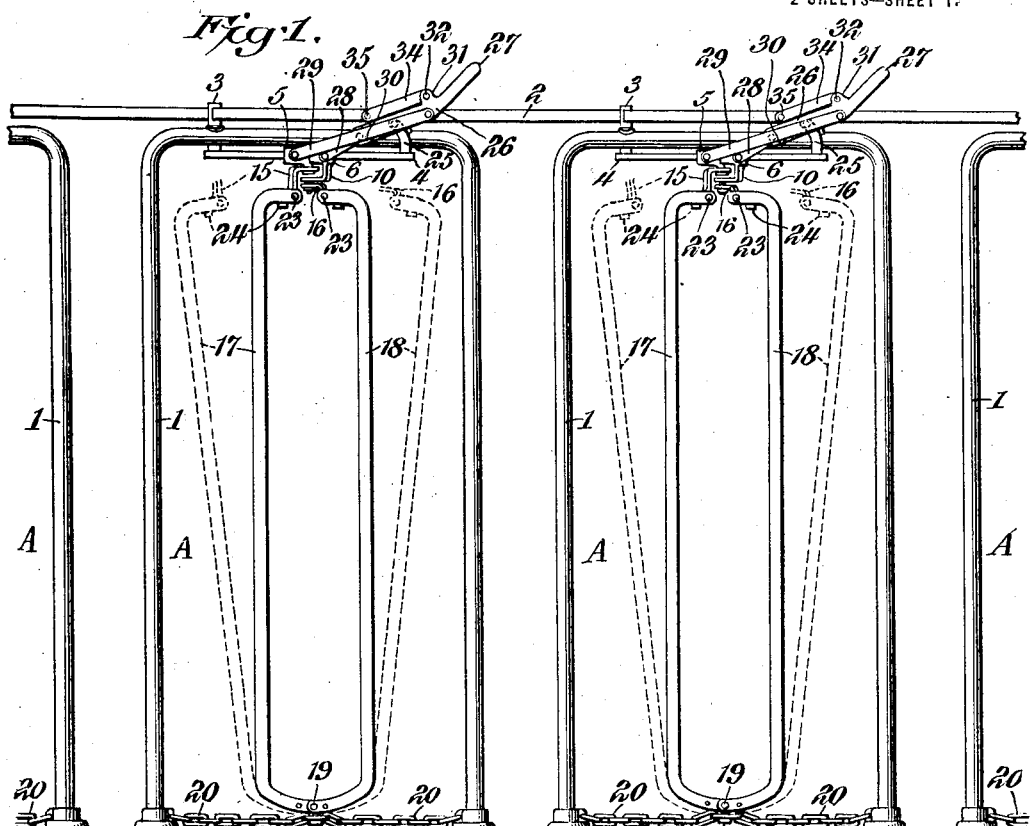
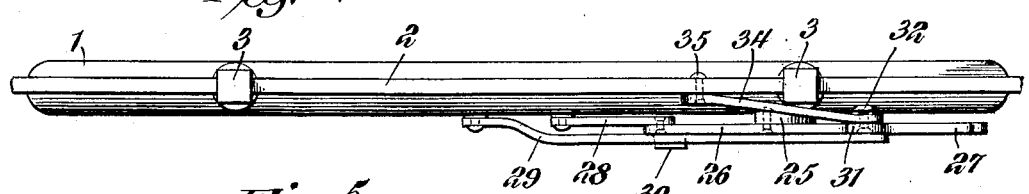
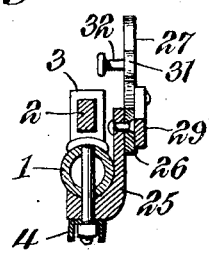
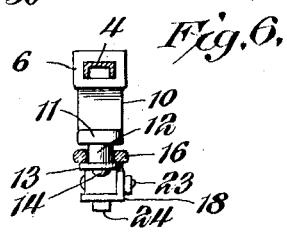

UNITED STATES PATENT OFFICE.

HAAKON P. HANSON, OF ALBERT LEA, MINNESOTA.

CATTLE-STANCHION.

1,360,940.  Specification of Letters Patent.  Patented Nov. 30, 1920.

Application filed January 7, 1919. Serial No. 270,017.

*To all whom it may concern:*

Be it known that I, HAAKON P. HANSON, a citizen of the United States, residing at Albert Lea, in the county of Freeborn and State of Minnesota, have invented a new and useful Cattle-Stanchion, of which the following is a specification.

This invention has reference to cattle stanchions, and its object is to provide a stanchion of particularly flexible, strong and cheap construction.

In accordance with the invention the stanchion structure is made in most part of tubing and structural steel and with a minimum amount of special castings, thereby cheapening the structure and the castings are of such nature that the stanchion when closed gives great freedom to the head of the animal while any of the stanchions may be unlocked, when desired, individually, or two or more stanchions, up to the full number, may be locked or unlocked simultaneously.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1 is an elevation of a series of stalls with the stanchions in the closed position and indicating the open position of the latter in dotted lines.

Fig. 2 is an elevation of the upper end of a single stall on a larger scale than Fig. 1, with the stanchion closed and some portions of the stanchion shown in section.

Fig. 3 is a view similar to Fig. 2 but showing the stanchion in the open position and also indicating some parts of the stanchion in section.

Fig. 4 is a plan view of the stall shown in Fig. 2.

Fig. 5 is a section on the line 5—5 of Fig. 2.

Fig. 6 is a section on the line 6—6 of Fig. 3.

Referring to the drawings, there is shown in Fig. 1 a series of stalls A, each comprising a stall arch or head 1 erected on a suitable flooring and preferably formed of piping bent into shape, each arch or head including, in the preferable form, a single piece of piping.

Extending along the top of the stalls and supported on the crown portions of the arches 1 is a master bar 2 carried by guide blocks 3 fast to the top of the crown of each stall arch. Secured to the crown or top of each stall arch in spaced relation below the latter and close to it is a bar guide 4 preferably though not necessarily of channel form, such channel bar being readily obtainable upon the market and possessing the requisite strength and cross sectional shape for the purposes of the invention. The bar 4 has a length considerably less than the width of the stall arches or heads. Mounted on the bar 4 to slide thereon are two castings or movable blocks 5 and 6 respectively. The casting 5 has a head portion traversed by the bar 4 so that the casting will move lengthwise of the bar 4 without turning or rocking to any material extent. At one end the head of the casting 5 has a depending lug or journal 7 of rounded cross section to constitute a swivel and at the lower extremity carries a washer 8 held to the swivel end of the casting by riveting or heading over as indicated at 9. Similarly the casting 6 has a passage through which the bar 4 extends so that the casting will lie snugly upon yet slide freely along the bar. Depending from the head of the casting 6 is an angle arm 10 having a laterally extended extremity 11 at the end of which latter there is a depending lug or journal 12 constituting a pivot or swivel, which, like the swivel 7, carries a washer 13 held in place by riveting or heading over the end of the swivel 12 as indicated at 14. The lugs or journals 7, 12 when the stanchion is in locked position, are located in the same vertical plane but in different horizontal planes.

Mounted on the swivel ends of the two slidable castings 5 and 6 are angle brackets 15 and 16 respectively, the bracket 15 being somewhat longer in one of its angle legs than the bracket 16, the longer bracket being swiveled on the casting 5, the depending portion of which is relatively short, and the shorter bracket 16 being swiveled on the casting 6. The relation of the parts is such that the lateral extension 11 of the arm 10 of the bracket 6 will underride the swivel 7 of the bracket 5 and the angle arm 10 is so related to the bracket 15 that the swivel 12 may be brought close enough to the bracket 15 to underride the swivel 7 in alinement therewith on an upright axis. At this time the two castings 5 and 6 are in abutment midway of the length of the bar 4. Each bracket 15 and 16 is fast to the upper end of a respective stanchion member 17 and 18, these stanchion members being connected at their lower ends by a pivot pin or bolt 19 and the lower pivoted end of the stanchion is connected by a chain 20 to the lower ends of the upright portions of the stall arch, the connection being by way of a swivel head 21 permitting the stanchion to turn in its connection with the chain. Each bracket 15 and 16 terminates in a foot 22 connected by bolts 23, 24 to the upper ends of the stanchion members 17 and 18, which stanchion members are formed of channel steel and have their upper ends bent at an angle toward each other to form a stanchion of customary shape. The arrangement is such that when the castings 5 and 6 are moved lengthwise of the bar 4 and this movement is toward each other, the members 17 and 18 of the stanchion are brought close enough together to properly embrace the neck of an animal and when separated the animal may withdraw its head from the stanchion, as is customary where certain types of stanchions are provided. The loose swivel connection at the bottom of the stanchion and the other swivel connections at the top of the stanchion, when the stanchion is closed, permit great freedom of movement of the head of an animal confined in the stanchion, about an upright axis, such freedom including 90° or more in opposite directions without any liability of the animal loosening its head from the stanchion.

Secured in any suitable manner to the arch 1 of the stall at or near one end of the bar 4 is a post or support 25 rising toward the top of the arch, and pivoted intermediate of its length to the upper end of the post is a lever 26 rockable in the direction of the length of the arch and master bar 2. The lever 26 at one end is formed into or provided with a handle 27 and at the other end is connected by a link 28 to the casting 6. Adjacent to the handle 27 the lever has pivoted thereto one end of a link 29, the other end of which is extended and pivoted to the casting 5, the two castings 5 and 6 constituting slidable stanchion holders. At that end of the lever 26 connected to the link 28 there is provided an offset lug 30 and at the end of the lever adjacent to the handle 27 there is an offset ear 31, the latter carrying a pin 32 adapted to be engaged in a notch 33 in one end of a pivoted link 34 connected by a pivot 35 to the master bar 2.

The lever 26 provides a manipulating means whereby the slidable stanchion holders or blocks 5 and 6 may be spread apart as shown in Fig. 3, or brought together as shown in Figs. 1 and 2.

When the lever 26 is in the position shown in Figs. 1 and 2, those ends of the links 28 and 29 connected to the castings or stanchion holders are close to each other and the lever 26 and link 29 are about in alinement one to the other with that end of the link 28 pivoted to the lever 26 past-center with respect to the end of the link 28 pivoted to the stanchion holder 6. Moreover, the link 29 is in engagement with the stop or lug 30 at the end of the link 26 remote from the handle 27. This constitutes a lock of the over or past-center type, preventing accidental loosening of the stanchions when once they are locked together. At the same time an intentional movement of the lever 26 toward the center of the stall will immediately unlock the stanchion members and separate them to the full extent, as shown in Fig. 3, thereby permitting the withdrawal of the head of the animal if previously confined in the stanchion. Each stanchion may be operated independently of the others if so desired, but if it be preferred to operate two or more stanchions at the same time the link 34 is utilized by moving the notched end 33 so as to engage over the pin 32, thus connecting the master bar 2 to the lever or levers 26. Now when any one of the levers is operated all the other levers connected to the master bar by the links 34 will participate in the movements of the operative lever, thus opening or closing all the stanchions which are connected to the master bar.

What is claimed is:—

1. In a stanchion structure, a stall head, a rigid guide bar secured to the upper end of the stall head and separate therefrom, separate means slidable upon said bar, one of said means having a depending lug, a bracket swiveled upon the lower end of said lug and secured to a stanchion member, the other of said means being provided with a depending angle arm longer than said lug, and a second bracket swiveled upon the end of said angle arm and secured to the other stanchion member, the parts being so disposed that when the stanchion members are closed the swivel connections will be in vertical alinement.

2. In a stanchion structure, a stall arch, a rigid guide bar having a length less than the width of said arch and secured thereto in spaced relation to the top of the arch, blocks slidable on said bar, lugs provided on said blocks and located in different horizontal planes, stanchion members mounted to swing toward and from each other at their upper ends, means for swivelly connecting said members to said lugs, whereby when said members are closed the swivel connections will lie in the same vertical line but in different horizontal planes, links individually connected to said blocks, and an operating lever connected to said links.

3. In a stanchion structure, a stall arch, a rigid guide bar having a length less than the width of said arch and secured thereto in spaced relation below the top of said arch, blocks embracing said bar and slidable thereon, one of said blocks having a depending angle arm, stanchion members mounted to swing to and from each other at their upper ends, and means for swivelly connecting the upper ends of said members to one of said blocks and to the angle arm of the other block, whereby when said members are closed the swivel connections will lie in the same vertical line but different horizontal planes, links individually connected to said blocks, and an operating lever connected to said links.

In testimony that I claim the foregoing as my own, I have hereto affixed my signature.

HAAKON P. HANSON.

Witnesses:
BURT KNOTVOLD,
EDUARD OLSON.